April 30, 1963 R. C. MULREADY ETAL 3,087,301
LEADING EDGE FUEL MANIFOLD
Filed July 13, 1960 2 Sheets-Sheet 1
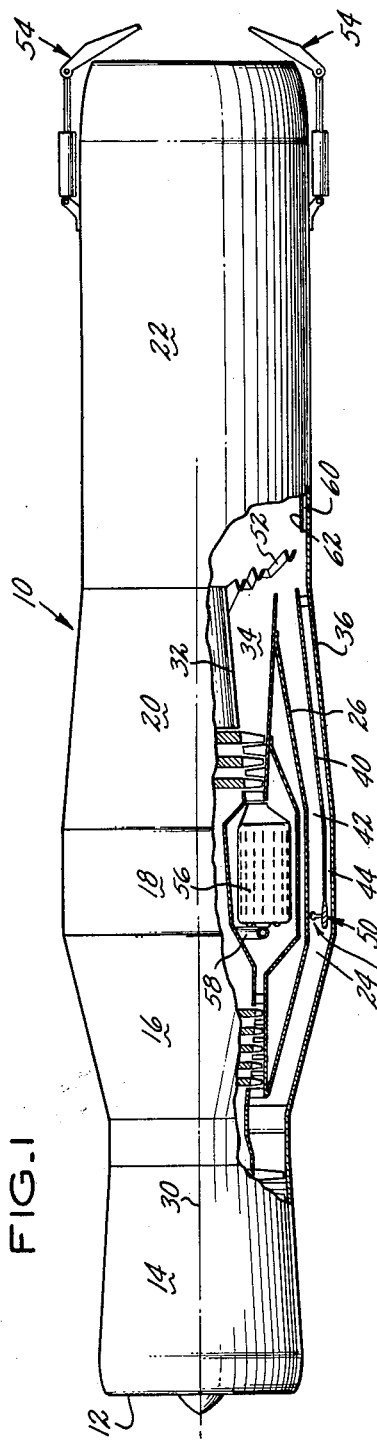
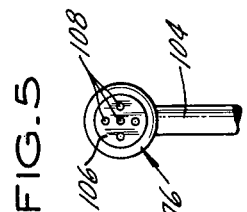
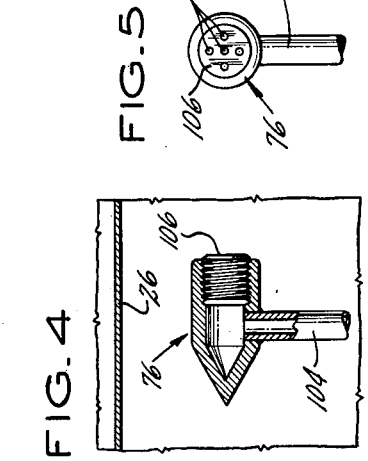
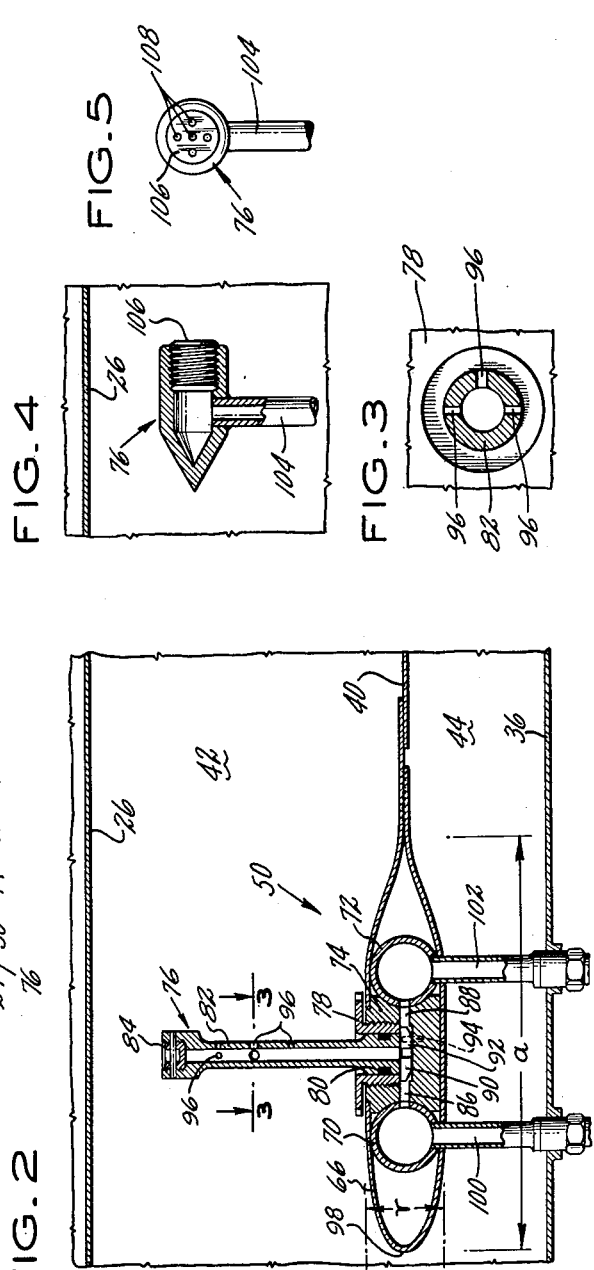
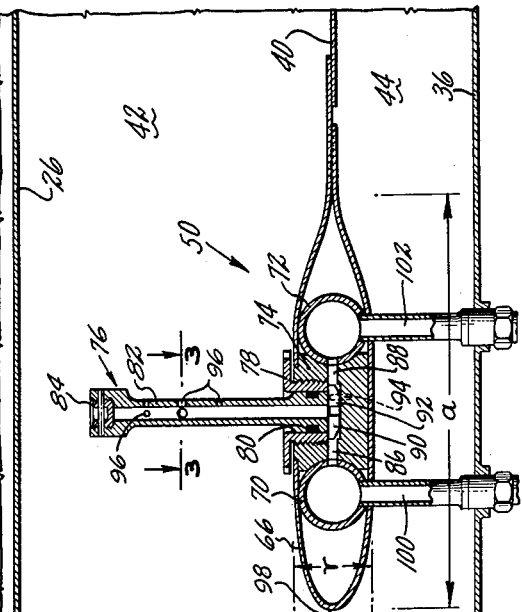
INVENTORS
RICHARD C. MULREADY
BERTRAND H. BROWN
ALEXANDER KURTI
BY Vernon F. Hauschild
ATTORNEY April 30, 1963   R. C. MULREADY ETAL   3,087,301
LEADING EDGE FUEL MANIFOLD
Filed July 13, 1960   2 Sheets-Sheet 2
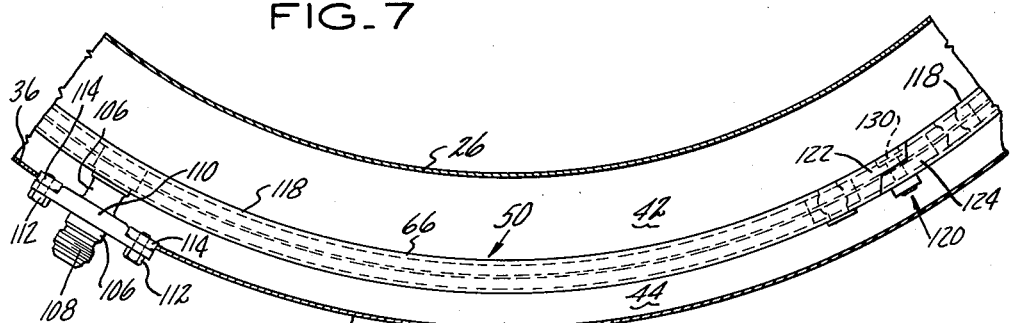
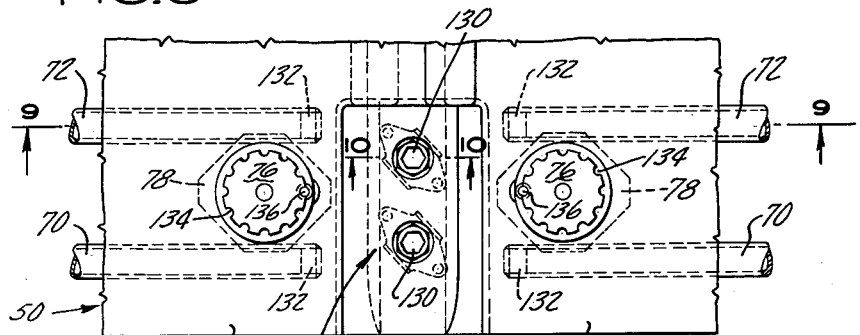
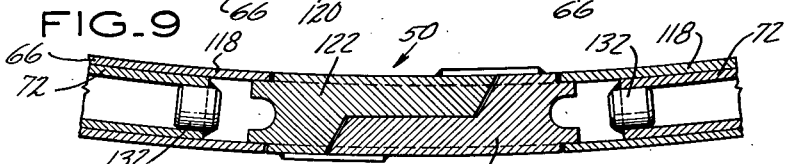
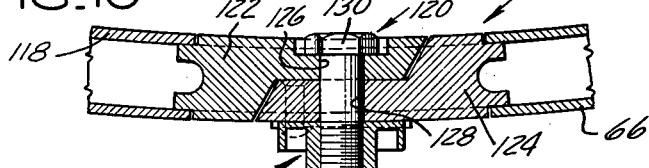
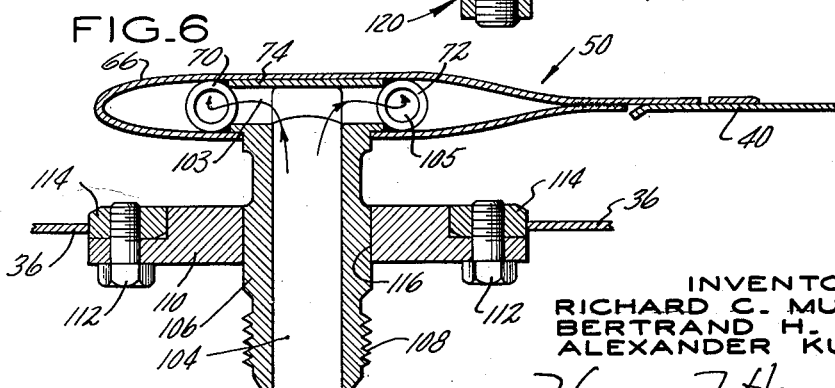
INVENTORS
RICHARD C. MULREADY
BERTRAND H. BROWN
ALEXANDER KURTI
BY Vernon F. Hauschild
ATTORNEY United States Patent Office 3,087,301
Patented Apr. 30, 1963

3,087,301
LEADING EDGE FUEL MANIFOLD
Richard C. Mulready, Jupiter, Fla., and Bertrand H. Brown, Glastonbury, and Alexander Kurti, North Woodbury, Conn., assignors to United Aircraft Corporation, East Hartford, Conn., a corporation of Delaware
Filed July 13, 1960, Ser. No. 42,660
4 Claims. (Cl. 60—35.6)

This invention relates to turbofan type engines with afterburners or turbo ramjet engines and more particularly to apparatus for introducing fuel into the engine for combustion in the afterburner.

It is an object of this invention to teach fuel injection apparatus comprising a fuel manifold positioned at the upstream end of a passage defining wall member, which manifold is enveloped within an airfoil-shaped ring member and carries fuel spray bars which project radially into the passage defined in part by the manifold carrying wall member to release a pattern of atomized fuel. The fuel is released at the passage inlet or upstream end and substantially at the radical center of the passage to eliminate raw fuel deposits on the passage walls.

It is a further object of this invention to teach fuel injection apparatus which positions the upstream end of a passage defining member.

It is a further object of this invention to teach fuel injection apparatus in which fuel is injected from radially directed fuel injecting apparatus which project from and receive fuel from a fuel manifold ring which is positioned at the upstream end of a shell of circular cross section, which shell is positioned concentrically between and coacts with annular passage walls to define a fuel-air mixing passage into which the fuel is injected and to further define a fuel-free cooling air passage adjacent but separate from said fuel-air mixing passage.

It is a further object of this invention to teach fuel injection apparatus including a fuel manifold which comprises plural conduits, each of which extends through substantially 120° of arc and is in mechanical connection but not fuel flow connection with the adjacent fuel conduit sections to define a fuel manifold ring enveloped within an airfoil shield at the forward end of the aforementioned shell and which manifold is connected by radial supports received in sliding engagement by the engine case to permit relative expansion between the manifold and the engine case. The aforementioned manifold sections are slidably received in plate members which are connected to the engine case, thereby permitting substantial movement and adjustment between the manifold and the case once the plate member has been removed to permit the connecting and disconnecting of the overlapping type connection between adjacent fuel manifold sections.

Other objects and advantages will be apparent from the specification and claims, and from the accompanying drawings which illustrate an embodiment of the invention.

FIG. 1 is a side view, partially broken away of a turbofan engine with afterburner illustrating our invention.

FIG. 2 is an enlarged partial view of a portion of our invention shown generally in FIG. 1.

FIG. 3 is an enlarged cross-sectional view taken along line 3—3 of FIG. 2.

FIG. 4 is a side view, partially in section of a second embodiment of the fuel injecting means used in our fuel injection apparatus.

FIG. 5 is a rear view of the embodiment shown in FIG. 4.

FIG. 6 is a modification similar to FIG. 2 but taken at a section other than through the fuel spray bar and illustrates the radial thermal expansion provision between the engine case and the shell or flow baffle.

FIG. 7 is a section taken thru the engine inner and outer cases to show a front view of the fuel injection apparatus.

FIG. 8 is a partial plan view of the fuel injection apparatus.

FIG. 9 is a showing taken along line 9—9 of FIG. 8.

FIG. 10 is a showing taken along line 10—10 of FIG. 8.

Referring to FIG. 1 we see afterburner turbofan engine 10 of the aircraft type which comprises air inlet section 12, engine fan section 14, compressor section 16, burner section 18, turbine section 20, afterburner section 22, and bypass duct or passage section 24. Inner or first engine case 26, which is of circular cross section and concentric about engine axis 30 envelops compressor section 16, burner section 18 and turbine section 20 and coacts with stationary inner body 32, which is preferably of circular cross section and concentric about axis 30 and diverging in a downstream direction, to form annular exhaust gas passage 34 through which the exhaust gases which pass through compressor section 16, burner section 18 and turbine section 20 are directed to afterburner section 22. Outer or second engine case 36 is also of circular cross section and concentric about axis 30 and envelops engine fan 14, engine inner case 26 and afterburner section 22. Engine inner case 26 and engine outer case 36 coact to define annular bypass duct or passage 24 which is in communication with fan section 14 at its upstream end and afterburner section 22 at its downstream end. Outer case is preferably of the slideable construction taught in U.S. Patent No. 2,614,384 to permit access to elements therewithin. A fuel baffle or wall 40, which is preferably a shell of circular cross section and concentric about axis 30 is positioned between engine inner case 26 and engine outer case 36 and extends axially therealong in bypass passage 24 to coact with engine inner duct 26 to define an annular fuel-air mixture passage 42 therebetween which is convergent in a downstream direction at its upstream end and to also coact with engine outer case 36 to define an annular cooling air passage 44 adjacent and external of fuel-air mixing passage 42. Passages 42 and 44 communicate with bypass passage 24 at their upstream ends and with afterburner section 22 at their downstream ends. Our fuel injection apparatus 50 is positioned at the upstream end of fuel baffle 40 in a fashion to be described more completely hereinafter. Flameholder unit 52, which may be of the type described more fully in U.S. Patent No. 3,002,352 is positioned at and carried by the after end of inner body 32 and extends outwardly therefrom to intersect the exhaust gases being discharged through exhaust gas passage 34 and the fuel-air mixture being discharged from fuel-air mixture passage 42, to establish a stagnant region and combustion zone downstream thereof to support the combustion of the fuel-air mixture therein. The fact that flameholder unit 52 tilts rearwardly or downstream as it projects radially outwardly serves to permit ignition of the fuel-air mixture in the relatively warm area downstream of passage 34 by use of any convenient means such as the hot-streak ignitor fully described in U.S. Patent No. 2,829,489, and the burning fuel-air mixture will pass radially outward along flameholder unit 52 to ignite and assist in supporting the combustion of the relatively cold fuel-air mixture located downstream of passage 42.

Afterburner 22 is shown to have an exhaust nozzle unit 54 at the downstream end thereof to vary the area of the outlet through which the afterburner exhaust gases are discharged to atmosphere to generate thrust. Exhaust nozzle unit 54 may be of any conventional type, one of which is fully described in U.S. Patent Nos. 2,836,034 and 2,815,643.

In operation, air enters the inlet section 12 of turbofan engine 10 to be compressed in fan section 14 thereof.

The air which is discharged from fan section 14 is then directed to afterburner section 22 by one of two possible routes or paths. In following the first of these routes, a portion of the air from fan section 14 passes through and is further compressed by compressor section 16, is then heated in passing through burner section 18 due to the combustion which is taking place in combustion chambers 56, which receive fuel through fuel nozzles attached to fuel manifold 58, and then passes through turbine section 20 wherein energy is extracted therefrom to drive fan 14 and compressor 16 and then passes through exhaust gas passage 34 and across flameholder unit 52 into afterburner 22 for further combustion therein. In following the second route, the remaining air from fan 14 will pass through bypass passage 24 and be intercepted by airfoil-shaped fuel injection apparatus 50 and diverted either into fuel-air mixing passage 42 or cooling air passage 44. The air which entered fuel-air mixture passage 42 mixes with atomized fuel which is discharged from fuel injection apparatus 50 into the upstream end of passage 42, preferably at several points throughout the circumferential periphery thereof, and at the substantially radial midpoint thereof to eliminate raw fuel deposits on fuel baffle 40 and inner engine case 26 and this fuel-air mixture passes across flameholder unit 52 for combustion in afterburner 22. This passage radial midpoint injection is of importance with regard to raw fuel deposit elimination since passage 42 is convergent in a downstream direction at its upstream end. The cooling air which passes through passage 44 passes generally radially external of fuel-air mixing passage 42 and a portion of this air enters afterburner cooling air passage 60, which is generally similar to the cooling shroud taught in U.S. Patent No. 2,851,854, between engine outer case 36 and afterburner cooling baffle 62.

Our fuel injection apparatus 50 is shown in greater particularity in FIG. 2. A hollow ring member 66 is supported in sliding fit fashion to the upstream end of fuel baffle 40 and projects upstream thereof to present an airfoil shape to the air of bypass duct 24 entering passages 42 and 44. Hollow ring member 66 is concentric about axis 30 and has axial dimension $a$ which is elongated and large relative to its radial dimension $r$, this dimension relation holding air blockage thereby to a minimum. Two axially spaced fuel manifold rings 70 and 72 are enveloped by hollow ring member 66. Fuel manifold rings 70 and 72 may act individually, in sequence, or jointly to give desired fuel flow flexibility. A plurality of connecting members 74 are located within hollow ring member 66, preferably at equally spaced circumferential positions thereabout, and attached by welding or other means to fuel manifold rings 70 and 72 and are further attached by welding or other means to hollow ring member 66. Between connecting member 74 hollow ring members 66 comprise a smooth-surfaced hollow airfoil shape of the contour generally illustrated in FIG. 2. Fuel spray member 76 is connected to each connecting member 74 by collar member 78 which screws into connecting member 74, by means of cooperating threads, to hold fuel spray member 76 in position and to compress ring seal 80 to prevent fuel leakage between fuel spray member 76 and collar 78. Obviously, a two-stage fuel injection system could be achieved by connecting a series of axially spaced fuel spray members to each fuel manifold ring 70 and 72. Fuel spray member 76, as shown in FIG. 2, comprises a radially extending hollow bar 82 which is plugged at its outer end by insert unit 84 and which communicates with fuel manifold rings 70 and 72 through passages 86 and 88, which align with passages 90 and 92 of fuel spray member 76. Dowel pin 94 engages recesses in connecting member 74 and fuel spray member 76 to prevent relative rotation therebetween. A plurality of apertures or perforations 96 pass through the walls of fuel spray member 76 and are positioned so as to direct fuel which passes therethrough in atomized form into the inlet end of fuel-air mixture passage 42 but somewhat downstream of the extreme upstream tip 98 thereof and so as to provide maximum radial and circumferential atomized fuel distribution yet avoiding raw fuel deposit on wall parts, preferably at the radial midpoint of passage 42. Fuel lines 100 and 102 are connected to fuel manifold rings 70 and 72, respectively, and also are supported by engine outer case 36 and serve both to transmit fuel from any pressurized source, not shown, to fuel manifold rings 70 and 72 and also to position fuel manifold rings 70 and 72 and hence the upstream end of fuel baffle 40 with respect to engine outer case 36.

A second embodiment of our fuel spray means 76 is shown in FIGS. 4 and 5 in which a radially extending hollow bar 104 extends from connecting members 74 of the type shown in FIG. 2 and communicates with the fuel manifold rings 70 and 72 and further communicates with a fuel nozzle 106 which has a plurality of axially downstream directed apertures or an atomizing orifice 108 therein. For raw fuel deposit prohibiting purposes, nozzle 106 is placed substantially at the radial midpoint of passage 42 at the upstream end thereof.

The fuel spray bar feature disclosed herein is claimed in U.S. Patent No. 2,988,878 issued on June 20, 1961, to Philip S. Hopper on Fuel Nozzle for Bypass Engine.

While our invention has been described in connection with an afterburner turbofan engine, it will be obvious to those skilled in the art that it is equally applicable to other powerplants, such as an afterburner turbo-ramjet engine and in either, the advantage of an elongated fuel-air mixing passage, as well as a fuel-free cooling air passage external thereof is achieved. This is particularly important at high Mach number, high altitude flight in which the bulk of the engine air is passed through bypass passage 24 so that the bulk of the fuel-air mixture to be burned in afterburner 22 will come from passage 42.

Referring to FIGS. 6–10 we see in greater particularity a preferred embodiment of fuel injection apparatus 50. In FIG. 6 we see that axially spaced fuel carrying tubes 70 and 72, which are enveloped within airfoil shield 66 and connected thereto and to each other by connecting means 74, receive fuel through passages 103 and 105, each of which is in communication with fuel passages 104 within radially extending support boss 106 which are equally spaced, preferably 120° apart, and circumferentially positioned about duct 36. Support boss 106 has thread provisions 108 for sealable connection to a fuel supply line, not shown, which is preferably pump supplied. Support boss 106 extends with slight clearance so as to permit radial motion therebetween through plate member 110, while plate member 110 is connected by any convenient connecting means such as bolts 112 to bolting pad 114 in engine outer case 36. It will be noted that due to the radial slidability between radially extending boss 106 and plate member 110 which has radially extending circular aperture 116 therein, thermal expansion is possible between outer case 36 and fuel injection apparatus 50 in a radial direction. Further, by the removal of connecting means 112, plate member 110 may be slid clear of support boss 106, thereby permitting substantial movement between support boss 106 which carries fuel injection member 50 and the mounting pad 114 in engine outer case 36, which clearance and relative movability assists in assembling and disassembling the fuel manifold sections 118. Each fuel manifold section 118 extends through substantially 120° of arc and is supported at its midpoint by support boss 106 and attaches at its opposite ends to the two adjacent fuel manifold sections 118 to cooperate therewith to form a hollow ring member 66. Adjacent fuel manifold sections 118 are connected by connecting means 120. Connecting means 120 includes overlapping members 122 and 124, which are attached in any convenient fashion such as welding to plug the adjacent ends of fuel manifold sections 118, as best shown in FIGS. 9 and 10. Overlapping members 122 and 124 include radially aligned holes 126 and 128 which receive axially spaced bolt and nut members 130, which positively connect adjacent ends of fuel manifold sections 118.

It will be noted by referring to FIGS. 8 and 9 that the axially spaced fuel tubes 70 and 72 are included in each of the fuel manifold sections 118 so that they extend through substantially 120° of arc and are blocked at their ends by plugs 132 so that there is no flow of fuel between the manifold sections 118.

As best shown in FIG. 8 the fuel spray bars 76 are each connected to fuel conduits 70 and 72 so that fuel may be received from either or both conduits 70 or 72 by each fuel spray bar 76. Accordingly, fuel may be admitted into fuel spray bar 76 and hence into fuel-air passage 42 from either of the fuel conduits 70 or 72, individually, or from both of the fuel conduits 70 and 72 jointly. By way of preferred embodiment, fuel spray bar 76 may be attached to member 66 by lock ring 134, which lock ring may be released by depressing depressible plunger 136.

By observing FIG. 6 it will be noted that the streamlined hollow ring member 66 presents a smooth airfoil to the engine air passing into passages 44 and 42 and thereby created no combustion supporting eddies or low pressure pockets. It will further be noted that while in a heated area, fuel could well be transmitted to fuel spray bars 76 through the interior of members 66 thereby providing an air insulating pocket between the fuel conduits and the skin of member 66 to avoid any possible ignition of the fuel due to overheating. It is preferable, however, to use tubes 70 and 72 for strength reasons.

It is to be understood that the invention is not limited to the specific embodiment herein illustrated and described but may be used in other ways without departure from its spirit as defined by the following claims.

We claim:

1. In a powerplant including outer, middle and inner ducts concentric about an axis and forming passages therebetween, a hollow ring member detachably attached at the forward end of the middle duct and joined in axially sliding sleeve fashion therewith to be removable therefrom, support means comprising hollow radial bosses radially slideably received in said outer duct and connected to said hollow ring member to support said hollow ring member and said middle duct with provisions for thermal expansion from said outer duct, said hollow ring member comprising at least three fuel manifold sections, means to connect said fuel manifold sections, each of said fuel manifold sections including at least one circumferentially extending fuel conduit, and means to pass fuel through said bosses and into said fuel conduits.

2. In a bypass powerplant having an axis and including outer, middle and inner ducts of circular cross-section and concentric about said axis and forming outer and inner annular passages therebetween, a hollow ring member of airfoil cross section and of elongated axial dimension located at the forward end of the middle duct and joined in axially sliding sleeve fashion therewith to be removable therefrom, readily removable plate members attached at selected, equally spaced circumferential locations around said outer duct and having an aperture in each, support means comprising circumferentially positioned and equally spaced hollow radial bosses radially slideably received in said removable plate and connected to said hollow ring member to support said hollow ring member and said middle duct with provisions for thermal expansion from said outer duct, said hollow ring member comprising three circumferentially extending fuel manifold sections each extending through substantially 120° of arc, means to connect said fuel manifold sections including means blocking off and extending from each end of said fuel manifold sections in overlapping fashion to the blocking means of adjacent fuel manifold sections and means to connect said overlapping blocking means so that said manifold is removable, each of said fuel manifold sections including two axially spaced and circumferentially extending fuel conduits, and means to pass fuel through said bosses and said fuel conduits into said inner annular passage.

3. In a bypass powerplant having an axis and including outer, middle and inner ducts of circular cross-section and concentric about said axis and forming outer and inner annular passages therebetween, a hollow ring member of airfoil cross section and of elongated axial dimension located at the forward end of the middle duct and joined in axially sliding sleeve fashion therewith to be removable therefrom, support means comprising circumferentially positioned and equally spaced hollow radial bosses radially slidably received in said outer duct and connected to said hollow ring member to support said hollow ring member and said middle duct with provisions for thermal expansion from said outer duct, plate members connected to said outer duct and having a radially extending hole sized to receive said bosses in sliding engagement, means to separate said outer duct to bore said hollow-ring member, said hollow ring member comprising three circumferentially extending fuel manifold sections each extending through substantially 120° of arc, means to connect said fuel manifold sections including means blocking off and extending from each end of said fuel manifold sections in overlapping fashion to the blocking means of adjacent fuel manifold sections and means to connect said overlapping blocking means so that said fuel manifold sections are removable with said outer duct so separated, each of said fuel manifold sections including two axially spaced and circumferentially extending fuel conduits, and means to pass fuel through said bosses and fuel conduits into said inner annular passage.

4. A turbofan engine having an axis and comprising an engine fan section, a compressor, a burner section, a turbine section and an afterburner section at the downstream end thereof, a stationary inner body of substantially circular cross section and concentric about said axis projecting rearwardly from said turbine to said afterburner section, a first engine case of substantially circular cross section enveloping said compressor, burner section and turbine section and extending rearwardly to said afterburner section to coact with said inner body to define an annular exhaust gas passage to direct the exhaust gas from said compressor, burner and turbine sections to said afterburner section, a second engine case of substantially circular cross section enveloping said fan section, first engine case and afterburner section and coacting with said first engine case to define an annular bypass passage therebetween connecting said fan section to said afterburner section, a fuel baffle of substantially circular cross section concentric with and positioned between said first and second engine cases and coacting with said first and second engine cases to define an annular fuel-air mixing passage and an annular cooling air passage, respectively, each communicating at its upstream end with said bypass passage and at its downstream end with said afterburner section, a hollow ring member attached to and coaxial with the upstream end of said fuel baffle and shaped to present an airfoil having an elongated axial dimension and a relatively small radial dimension to the air entering said passages thereby creating no combustion supporting edges, two axially spaced fuel manifold conduits enveloped with in said ring member with insulative air space therebetween, a plurality of connecting members in said hollow ring member positioned between and connected to said fuel manifold conduits and said hollow ring member, readily removable plate members attached at selected, equally spaced circumferential locations around said second engine case and having an aperture in each, support means comprising hollow radial bosses radially slidably received in said plate members of said second engine case and connected to said hollow ring member to support said hollow ring member and said fuel baffle with provisions for thermal expansion from said second engine case, said hollow ring member comprising at least three fuel manifold sections, means to connect said fuel manifold section, and means to pass fuel through said bosses and fuel manifold sections into said fuel-air mixing passage.

References Cited in the file of this patent
UNITED STATES PATENTS

| | | |
|---|---|---|
| 2,672,727 | Brown | Mar. 23, 1954 |
| 2,704,435 | Allen | Mar. 22, 1955 |
| 2,860,483 | Fox | Nov. 18, 1958 |
| 2,970,438 | Howald | Feb. 7, 1961 |
| 2,988,878 | Hopper | June 20, 1961 |